US012679427B2

(12) United States Patent
Shao et al.

(10) Patent No.: US 12,679,427 B2
(45) Date of Patent: Jul. 14, 2026

(54) METHODS FOR REGULATING AIR CONDITIONING TEMPERATURE OF SUBWAYS IN SMART CITIES AND INTERNET OF THINGS SYSTEMS THEREOF

(71) Applicant: CHENGDU QINCHUAN IOT TECHNOLOGY CO., LTD., Chengdu (CN)

(72) Inventors: Zehua Shao, Chengdu (CN); Haitang Xiang, Chengdu (CN); Yaqiang Quan, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 777 days.

(21) Appl. No.: 18/169,900

(22) Filed: Feb. 16, 2023

(65) Prior Publication Data
US 2023/0192157 A1 Jun. 22, 2023

(30) Foreign Application Priority Data
Dec. 14, 2022 (CN) .......................... 202211619252.3

(51) Int. Cl.
*B61D 27/00* (2006.01)
*G05B 19/042* (2006.01)

(52) U.S. Cl.
CPC ....... *B61D 27/0018* (2013.01); *G05B 19/042* (2013.01); *G05B 2219/2614* (2013.01)

(58) Field of Classification Search
CPC .............. B61D 27/0018; B61D 27/009; G05B 19/042; G05B 2219/2614
See application file for complete search history.

(56) References Cited

U.S. PATENT DOCUMENTS

2015/0354844 A1* 12/2015 Kates ........................ F24F 11/46
236/51
2021/0041127 A1* 2/2021 Risbeck ................... F24F 11/62

FOREIGN PATENT DOCUMENTS

CN 109109887 B 12/2019
CN 113830115 A * 12/2021 ......... B61D 27/0018
(Continued)

OTHER PUBLICATIONS

Kim Kui Chan, KR100999861B1, Dec. 9, 2010, [online]. Translation [retrieved on Dec. 30, 2025] retrieved from internet: machine translation by IP.com. (Year: 2010).*
(Continued)

*Primary Examiner* — Robert E Fennema
*Assistant Examiner* — Marzia T Monty
(74) *Attorney, Agent, or Firm* — METIS IP LLC

(57) ABSTRACT

The embodiments of the present disclosure provide a method and an Internet of Things system for regulating air conditioning temperature of a subway in a smart city. The method includes: obtaining, based on at least one collecting device including at least one first collecting device and at least one second collecting device, temperature data and humidity data inside and outside a carriage of a plurality of carriages of the subway; and determining, based on the temperature data and the humidity data, refrigeration power adjustment values and ventilation adjustment values of the plurality of carriages and generating a control instruction for controlling a temperature regulation device and a ventilation device.

15 Claims, 6 Drawing Sheets

300

(56) References Cited

FOREIGN PATENT DOCUMENTS

| KR | 100999861 B1 | * | 12/2010 | .............. | F24F 11/62 |
| KR | 102079169 B1 | * | 2/2020 | ............ | H04W 84/18 |

OTHER PUBLICATIONS

Park Jong Gook, KR102079169B1, Feb. 19, 2020, [online]. Translation [retrieved on Dec. 30, 2025] retrieved from internet: machine translation by IP.com. (Year: 2020).*
Shi, Yu-li, CN113830115A, Dec. 24, 2021, [online]. Translation [retrieved on Dec. 31, 2025] retrieved from internet: machine translation by IP.com. (Year: 2021).*

* cited by examiner

100

<u>200</u>

Collecting Device <u>210</u>

First Collecting
Device <u>211</u>

Second Collecting
Device <u>212</u>

First Determination
Module <u>220</u>

Second Determination
Module <u>260</u>

Temperature Regulation
Device <u>230</u>

Third Determination
Module <u>270</u>

Ventilation Device
<u>240</u>

Image Monitoring
Device <u>280</u>

Reference Database
Determination Module
<u>250</u>

Figure 3:
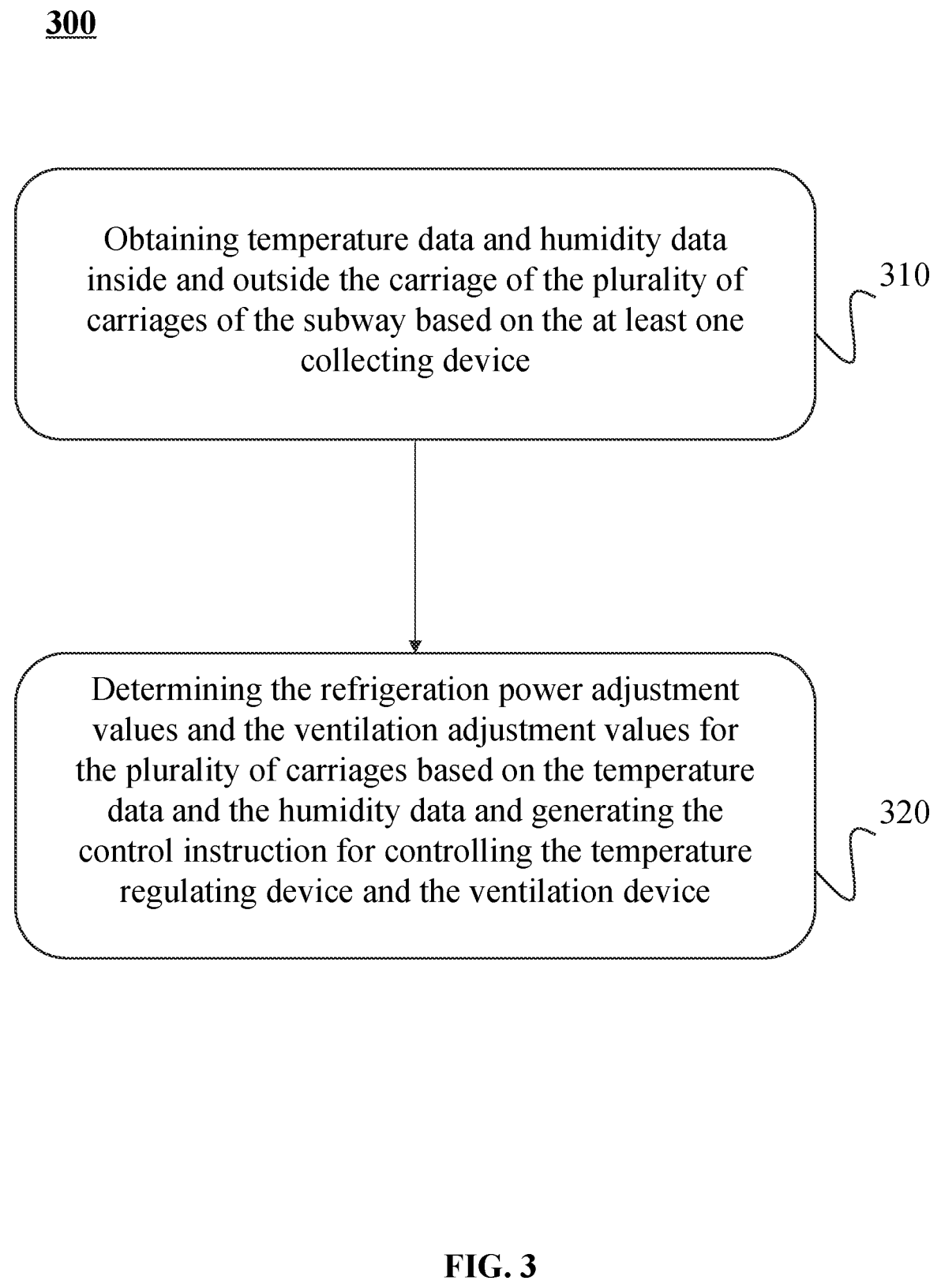

Obtaining temperature data and humidity data inside and outside the carriage of the plurality of carriages of the subway based on the at least one collecting device

310

Determining the refrigeration power adjustment values and the ventilation adjustment values for the plurality of carriages based on the temperature data and the humidity data and generating the control instruction for controlling the temperature regulating device and the ventilation device

Figure 4:
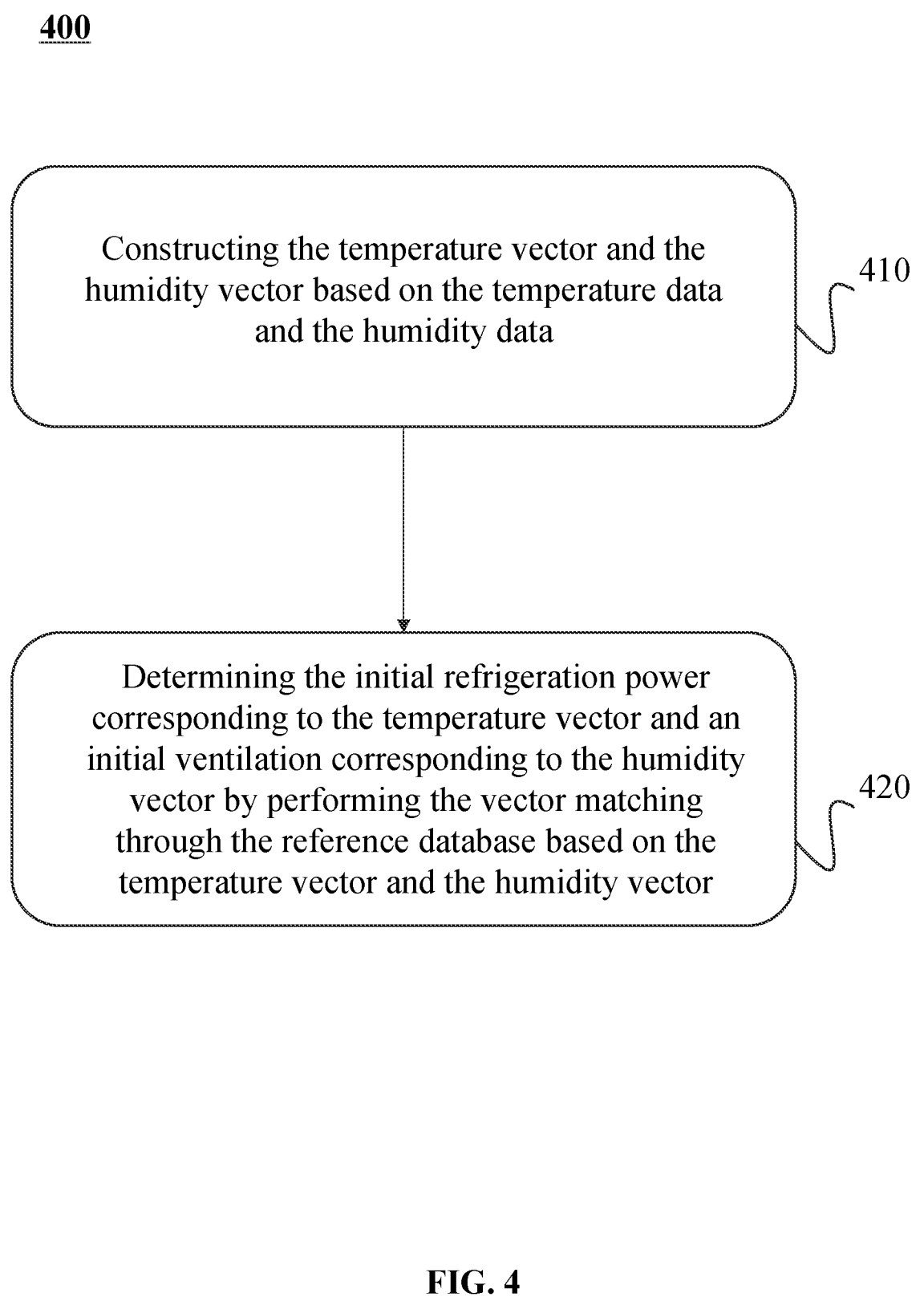

Constructing the temperature vector and the humidity vector based on the temperature data and the humidity data    410

Determining the initial refrigeration power corresponding to the temperature vector and an initial ventilation corresponding to the humidity vector by performing the vector matching through the reference database based on the temperature vector and the humidity vector    420

Figure 5:
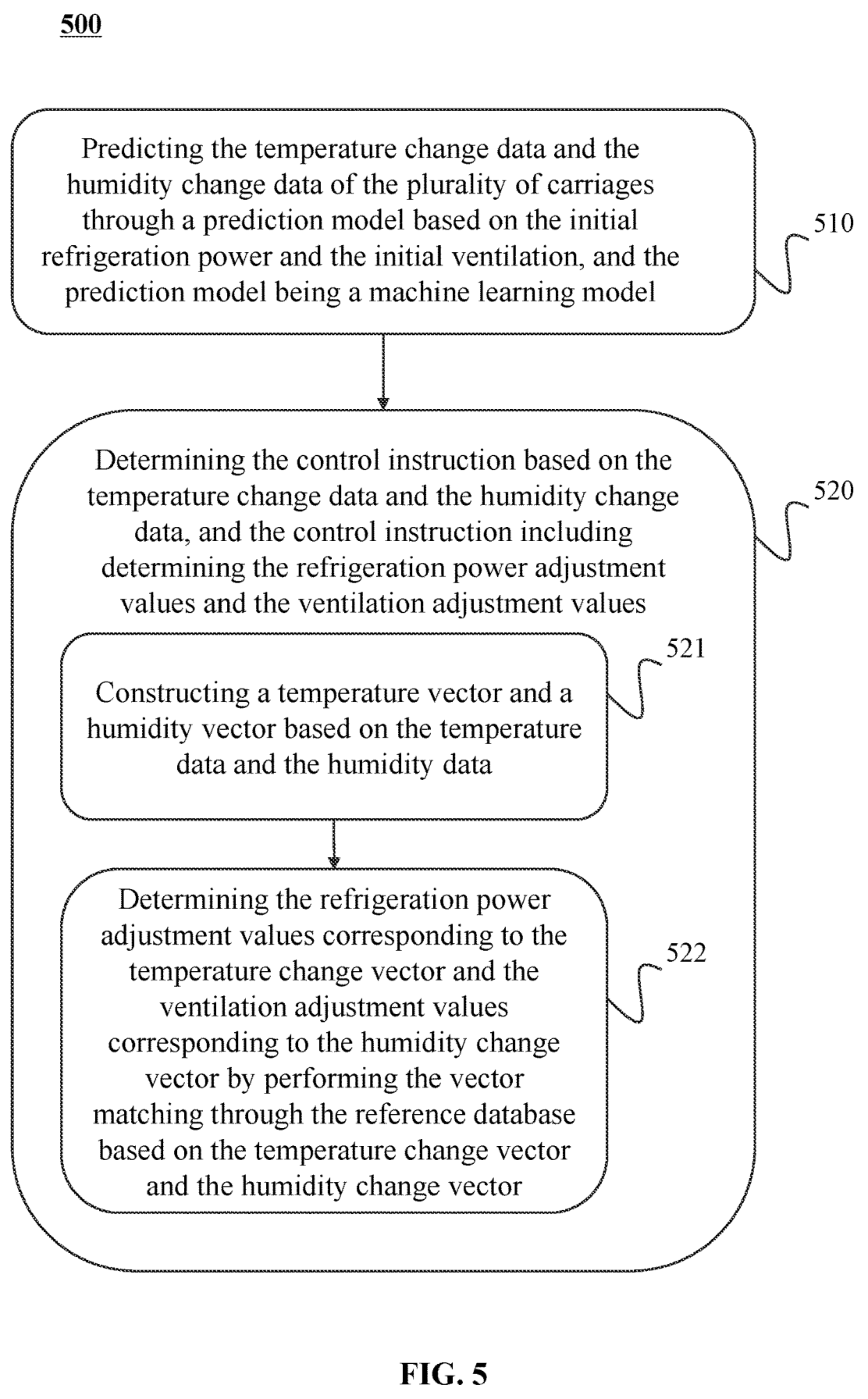

Predicting the temperature change data and the humidity change data of the plurality of carriages through a prediction model based on the initial refrigeration power and the initial ventilation, and the prediction model being a machine learning model

510

Determining the control instruction based on the temperature change data and the humidity change data, and the control instruction including determining the refrigeration power adjustment values and the ventilation adjustment values

520

Constructing a temperature vector and a humidity vector based on the temperature data and the humidity data

521

Determining the refrigeration power adjustment values corresponding to the temperature change vector and the ventilation adjustment values corresponding to the humidity change vector by performing the vector matching through the reference database based on the temperature change vector and the humidity change vector

METHODS FOR REGULATING AIR CONDITIONING TEMPERATURE OF SUBWAYS IN SMART CITIES AND INTERNET OF THINGS SYSTEMS THEREOF

CROSS-REFERENCE TO RELATED APPLICATIONS

This application claims priority to Chinese Patent Application No. 202211619252.3, filed on Dec. 14, 2022, the entire contents of which are incorporated herein by reference.

TECHNOLOGY FIELD

The present disclosure relates to technical field of in-vehicle environment control, and in particular, to methods for regulating air conditioning temperature of a subway in a smart city and an Internet of Things systems.

BACKGROUND

In subway, train, bus, and other public transportation, to provide passengers with a comfortable riding environment, generally, a temperature and humidity regulation system is set up. However, due to a large space inside the carriage and an uneven dispersion of people inside the carriage, a large fluctuation of temperature and humidity occurs inside the carriage. When the vehicle stops at the platform and opens the door, the environment inside the carriage circulates with the outside environment, the flow of people getting on and off the carriage is large, and the count of people inside the carriage is variable, which leads to the temperature and the humidity inside the carriage difficult to maintain stable. Therefore, the present disclosure proposes a method for regulating the air conditioning temperature of a subway in a smart city and an Internet of Things system that can regulate the temperature and the humidity inside the carriage in a timely and accurate manner.

SUMMARY

According to one or more embodiments of the present disclosure, a method for regulating air conditioning temperature of a subway in a smart city is provided. The method is executed based on a management platform of an Internet of Things system for regulating air conditioning temperature of a subway in a smart city. The method includes: obtaining, based on at least one collecting device, temperature data and humidity data inside and outside a carriage of a plurality of carriages of the subway; and determining, based on the temperature data and the humidity data, refrigeration power adjustment values and ventilation adjustment values of the plurality of carriages and generating a control instruction for controlling a temperature regulation device and a ventilation device. The at least one collecting device includes at least one first collecting device and at least one second collecting device, the at least one first collecting device is installed at a first preset position inside the carriage, and a distance between two adjacent first collecting devices satisfies a first preset condition; and the at least one second collecting device is installed at a second preset position within a platform, and a distance between two adjacent second collecting devices satisfies a second preset condition.

According to one or more embodiments of the present disclosure, an Internet of Things system for regulating air conditioning temperature of a subway in a smart city is provided. The Internet of Things system includes a management platform. The management platform is configured to obtain temperature data and humidity data inside and outside a carriage of a plurality of carriages of the subway through at least one collecting device; and determine, based on the temperature data and the humidity data, refrigeration power adjustment values and ventilation adjustment values of the plurality of carriages and generate a control instruction for controlling a temperature regulation device and a ventilation device; regulate temperature of the plurality of carriages through the temperature regulating device; and regulate humidity of the plurality of carriages through the ventilation device. The at least one collecting device includes at least one first collecting device and at least one second collecting device, the at least one first collecting device is installed at a first preset position inside the carriage, and a distance between two adjacent first collecting devices satisfies a first preset condition; and the at least one second collecting device is installed at a second preset position within a platform, and a distance between two adjacent second collecting devices satisfies a second preset condition.

BRIEF DESCRIPTION OF THE DRAWINGS

The present disclosure will be further illustrated by way of exemplary embodiments, which will be described in detail by way of the accompanying drawings. These embodiments are not limiting, and in these embodiments, the same counting indicates the same structure, wherein:

FIG. 2 is a diagram illustrating an exemplary module of an Internet of Things system for regulating conditioning temperature of a subway in a smart city according to some embodiments of the present disclosure;

FIG. 3 is a flowchart illustrating an exemplary method for regulating air conditioning temperature of a subway in a smart city according to some embodiments of the present disclosure;

FIG. 4 is an exemplary flowchart of determining initial refrigeration power and initial ventilation according to some embodiments of the present disclosure;

FIG. 5 is an exemplary flowchart of determining refrigeration power adjustment values and ventilation adjustment values according to some embodiments of the present disclosure;

DETAILED DESCRIPTION

Figure 1:
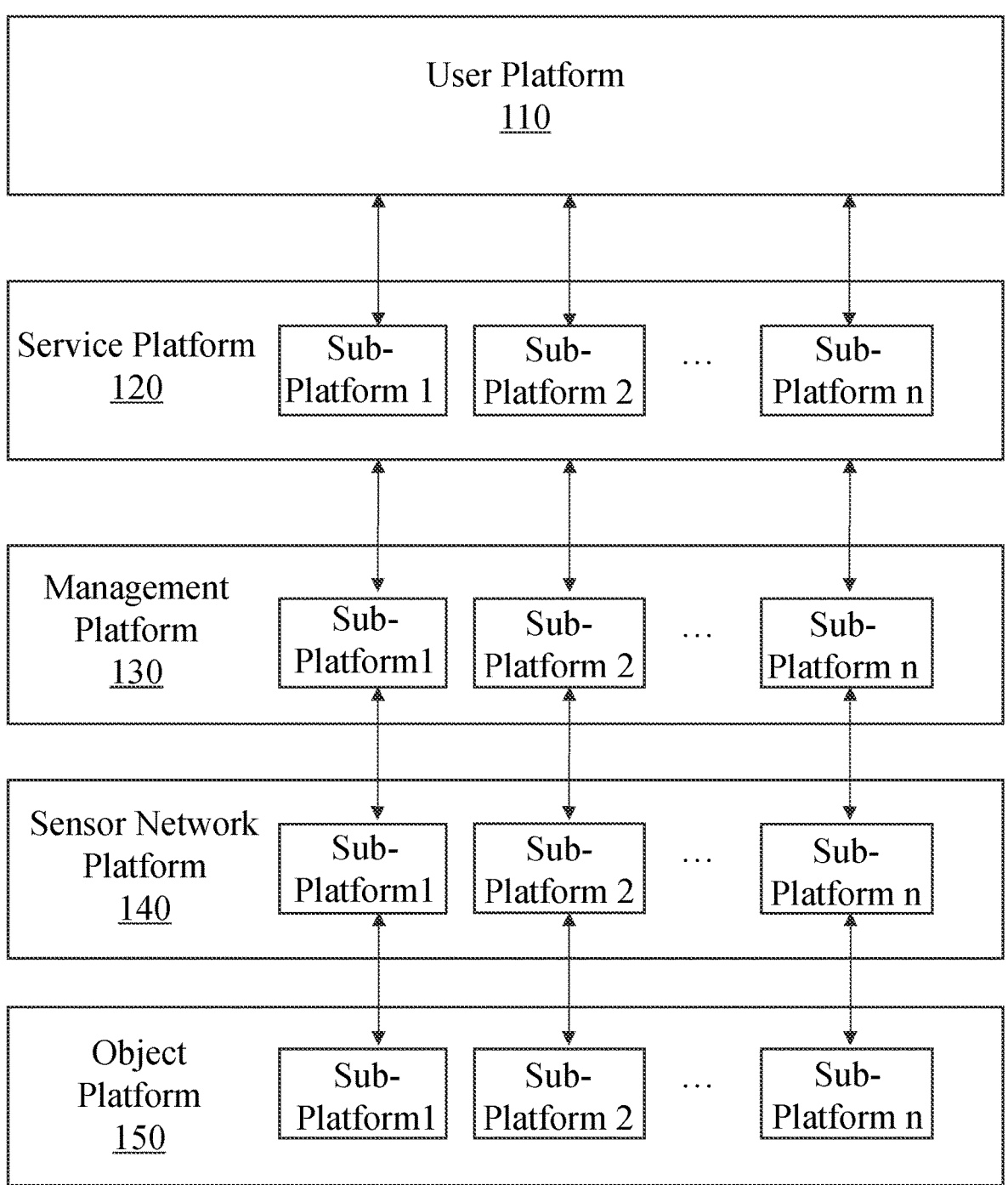
FIG. 1 is a schematic diagram illustrating an exemplary structure of an Internet of Things system for regulating conditioning temperature of a subway in a smart city according to some embodiments of the present disclosure.

To more clearly illustrate the technical solutions of the embodiments of the present disclosure, the accompanying drawings that need to be used in the description of the embodiments would be briefly introduced below. Obviously, the accompanying drawing in the following description is merely some examples or embodiments of the present disclosure, and those skilled in the art can apply the present disclosure to other similar situations according to the drawings without any creative effort. Unless obviously obtained from the context or the context illustrates otherwise, the same numeral in the drawings indicates the same structure or operation.

It will be understood that the terms "system," "device," "unit," and/or "module" used herein are used to distinguish different components, elements, parts, sections, or assemblies of different levels. However, the terms may be displaced by other expressions if they may achieve the same purpose.

As used in the present disclosure and the appended claims, the singular forms "a," "an," and "the" are intended to include plural referents, unless the content clearly dictates otherwise. Generally, the terms "comprise" and "include" only imply that the clearly identified steps and elements are included, but these steps and elements do not constitute an exclusive list, and the method or device may further include other steps or elements.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

FIG. 1 is a schematic diagram illustrating an exemplary structure of an Internet of Things system for regulating conditioning temperature of a subway in a smart city according to some embodiments of the present disclosure.

An Internet of Things system is an information processing system that includes some or all of the platforms among a user platform, a service platform, a management platform, a sensor network platform, and an object platform. The user platform is a functional platform to realize obtaining of user perception information and generation of control information. The service platform may realize a connection between the management platform and the user platform, and plays a function of perception information service communication and control information service communication. The management platform may arrange and coordinate the connection and collaboration between the functional platforms (such as the user platform and the service platform). The management platform aggregates information of an Internet of Things operation system and may provide functions of perception management and control management for the Internet of Things operation system. The sensor network platform is a functional platform for managing sensor communication. In some embodiments, the sensor network platform may connect the management platform and the object platform to realize functions of perception information sensor communication and control information sensor communication. The object platform is a functional platform of generating perception information.

A processing of information in the Internet of Things system may be divided into a process flow of user perception information and a process flow of control information. The control information may be information generated based on user perception information. In some embodiments, the control information may include user demand control information, and the user perception information may include user query information. In particular, the processing of perception information is that the object platform obtains the perception information and transmits the perception information to the management platform through the sensor network platform. The user demand control information is then transmitted from the management platform to the user platform through the service platform, thereby enabling the control of prompt message delivery.

As shown in FIG. 1, the Internet of Things system 100 for regulating air conditioning temperature of a subway in a smart city includes a user platform 110, a service platform 120, a management platform 130, a sensor network platform 140, and an object platform 150 that interacts in sequence.

The user platform 110 is a user-driven platform that may be configured to interact with users, including obtaining the user's demand and feeding information back to the user. The user may include a subway manager, etc.

In some embodiments, the user platform 110 is configured as a terminal device. For example, the terminal device may include a mobile device, a tablet computer, etc., or any combination thereof. In some embodiments, the user platform 110 may be configured to receive the information and/or instruction. For example, the user platform 110 may feed an air conditioning temperature regulating scheme of a carriage of the subway corresponding to each operation line of subway in city back to the user, which facilitates querying and managing for the user.

In some embodiments, the user platform 110 may be configured to interact with the service platform 120 downward, including: sending a query instruction of the air conditioning temperature regulating scheme of the carriage of the subway to the service platform 120, receiving the air conditioning temperature regulating scheme of the carriage of the subway uploaded by the management platform 130 and feeding the air conditioning temperature regulating scheme of the carriage of the subway back to a user, etc.

The service platform 120 is a platform configured to provide the user with a query service. For example, the user queries the air conditioning temperature regulating scheme of the carriage of the subway through the service platform 120, etc.

In some embodiments, the service platform 120 may include a plurality of independent sub-platforms, which operates and processes the data independently and interacts with upper and lower functional platforms directly.

In some embodiments, the plurality of sub-platforms of the service platform 120 corresponds to different operation lines of the subway, respectively. For example, a service sub-platform 1 corresponds to subway line 1, a service sub-platform 2 corresponds to a subway line 2, etc. In some embodiments, different service sub-platforms may independently receive various instructions from the user platform 110 and independently provide feedback on various information, data, etc.

In some embodiments, the service platform 120 may also be configured to interact with the user platform 110 and the management platform 130, including: receiving the query instruction of the air conditioning temperature regulating scheme of the carriage of the subway sent by the user platform 110, sending the query instruction of the air conditioning temperature regulating scheme of the carriage of the subway to the management platform 130, receiving the air conditioning temperature regulating scheme of the carriage of the subway uploaded by the management platform 130 and uploading the air conditioning temperature regulating scheme of the carriage of the subway to the user platform 110.

The management platform 130 is a platform that arranges and coordinates the connection and collaboration between each functional platform, aggregating all the information of the Internet of Things, and provides the functions of the perception management and the control management for the Internet of Things operation system. For example, the management platform 130 may be configured to upload the air conditioning temperature regulating scheme of the carriage of the subway to the service platform 120 in response to a user's query demand. In some embodiments, the management platform 130 may also be configured to execute the method for regulating air conditioning temperature of a subway in a smart city. For example, the management platform 130 may execute relevant data of the carriage of the subway uploaded by the sensor network platform to determine the air conditioning temperature regulating schemes corresponding to different subway lines, etc. The relevant data of the carriage of the subway may include environmental data (e.g., temperature, humidity), pedestrian flow data (e.g., count of people getting on and off the train), etc.

In some embodiments, the management platform 130 may include a plurality of sub-platforms. The plurality of sub-platforms of management platform 130 may be divided based on different operation lines of the subway (e.g., a management sub-platform 1 corresponds to a subway line 1, a management sub-platform 2 corresponds to a subway line 2, etc.) and correspond to the plurality of service sub-platforms of the service platform 120. For example, the management sub-platform 1 corresponds to the service sub-platform 1, the management sub-platform 2 corresponds to the service sub-platform 2, etc.

In some embodiments, the management platform 130 may also be configured to interact with the service platform 120 and the sensor network platform 140, including: by the each sub-platform of the management platform 130, receiving the query instruction of the air conditioning temperature regulating scheme of the carriage of the subway sent by the corresponding service platform, sending an instruction for obtaining related data of the carriage of the subway to the sensor network platform, receiving and processing the related data of the carriage of the subway uploaded by the sensor network platform, and uploading the air conditioning temperature regulating scheme of the carriage of the subway to the service platform.

The sensor network platform 140 is a functional platform configured to connect the management platform 130 and the object platform 150 of the Internet of Things system for regulating air conditioning temperature of a subway in a smart city, and realize functions of perception information sensor communication and control information sensor communication. In some embodiments, the sensor network platform 140 may be configured as a communication network and an Internet of Things gateway.

In some embodiments, the sensor network platform 140 may include a plurality of sub-platforms. The various sub-platforms of the sensor network platform 140 may be divided based on different operation lines of the subway (e.g., the sensor network sub-platform 1 corresponds to the subway line 1, the sensor network sub-platform 2 corresponds to the subway line 2, etc.) and correspond to the plurality of management sub-platforms of the management platform 130. For example, the sensor network sub-platform 1 corresponds to the management sub-platform 1, the sensor network sub-platform 2 corresponds to the management sub-platform 2, etc. In some embodiments, each sub-platform of the sensor network platform 140 may obtain data of the carriage of the subway from the object sub-platform of the corresponding operation line of the subway. For example, the sensor network sub-platform 1 may obtain related data of each carriage of the subway of the subway line 1 from the object sub-platform corresponding to the subway line 1, etc.

In some embodiments, the sensor network platform 140 may also be configured to interact with the management platform 130 and the object platform 150, including: by the each sub-platform of the sensor network platform, receiving the instruction for obtaining the related data of the carriage of the subway sent by the management platform, sending the instruction for obtaining the related data of the carriage of the subway to the object platform, receiving the related data of the carriage of the subway uploaded by object platform, and uploading the related data of the carriage of the subway sent by the sensor network platform to the management platform.

The object platform 150 is a platform configured to obtain the related data of the carriage of the subway. In some embodiments, the object platform 150 may be configured as various types of data collecting devices, for example, a camera device, a thermometer, a hygrometer, etc. Different devices are configured with one unique identifier to facilitate deployment in different operation lines of the subway for management.

In some embodiments, the object platform 150 may include a plurality of object sub-platforms. The different sub-platforms of the plurality of object sub-platforms respectively correspond to a subway operation line including a station site deployed at the corresponding operation line, a device in the carriage of the subway, etc. For example, a object sub-platform 1 corresponds to the site of the subway line and various collecting devices such as the camera device, the thermometer, the hygrometer, etc., in carriages.

In some embodiments, the object platform 150 may also be configured to interact with the sensor network platform 140, including: by each sub-platform of the object platform 150, receiving the instruction for obtaining related data of carriage of the subway sent by the corresponding sensor network sub-platform; and uploading the related data of carriage of the subway to the corresponding sensor network sub-platform.

In some embodiments, different "service sub-platforms-management sub-platforms-sensor network sub-platforms-object sub-platforms" for different operation lines of the subway are independent branches, which may process relevant data and instruction in parallel and independently and provide the feedback to the user platform 110 independently.

In some embodiments, the Internet of Things system 100 for regulating air conditioning temperature of a subway in a smart city processes the related data of the carriage of the subway of different operation lines of the subway through a plurality of independent branches, which may reduce pressure of data processing, while enabling the each operation line of the subway across the city to independently manage their temperature regulating schemes of the carriage of the subway, targeting to regulate the air conditioning temperature of the subway of different lines, so that a better effect is obtained.

It should be noted that the above description of the smart city Internet of Things system for regulating conditioning temperature of a subway and its modules is merely provided for the purposes of illustration, and is not intended to limit the scope of the present disclosure. It can be understood that for those skilled in the art, after understanding the principle of the system, it may be possible to make any combination of each module or form a subsystem to connect with other modules without departing from this principle. In some embodiments, the user platform, the service platform, management platform, the sensor network platform, and the object platform disclosed in FIG. 1 may be different modules in one system, or one module that may implement the functions of two or more of the above modules. For example, each module may share one storage module, and the each module may have its own storage module. Variations such as these are within the scope of protection of the present disclosure.

FIG. 2 is a diagram illustrating an exemplary module of an Internet of Things system for regulating conditioning temperature of a subway in a smart city according to some embodiments of the present disclosure. As shown in FIG. 2, in some embodiments, a system module 200 may include a collecting device 210, a first determination module 220, a temperature regulation device 230, a ventilation device 240, a reference database determination module 250, a second determination module 260, a third determination module 270, and an image monitoring device 280.

In some embodiments, the each module of the system module 200 (e.g., the collecting device 210, the first determination module 220, the temperature regulation device 230, the ventilation device 240, etc.) may be regulated or may transmit the information through the management platform 130. For example, the management platform 130 may obtain temperature data and humidity data inside and outside the carriages of the plurality of carriages of the subway through at least one collecting device 210. As another example, the management platform 130 may also determine the refrigeration power adjustment values and the ventilation adjustment values of the plurality of carriages and generate a control instruction for controlling a temperature regulation device and a ventilation device based on the temperature data and the humidity data through the first determination module 220. More descriptions regarding a connection between the management platform 130 and the each module of the system module 200 may be found in related descriptions below.

The collecting device 210 may be configured to collect the temperature data and the humidity data inside and outside of the plurality of carriages of the subway. In some embodiments, the count of the collecting device 210 is at least one. In some embodiments, the at least one collecting device 210 may include at least one first collecting device 211 and at least one second collecting device 212. The first collecting device 211 may be configured to collect the temperature data and the humidity data inside the plurality of carriages of the subway. The second collecting device 212 may be configured to collect the temperature data and the humidity data outside the plurality of carriages of the subway. In some embodiments, the second collecting device 212 may be configured to collect the temperature data and the humidity data inside the platform of the subway.

The first determination module 220 may determine the refrigeration power adjustment values and the ventilation adjustment values of the plurality of carriages and generate a control instruction based on the temperature data and the humidity data.

The temperature regulating device 230 may refer to a device for regulating the temperature inside the plurality of carriages of the subway. In some embodiments, the temperature regulating device 230 may include, but is not limited to, an air conditioner, a refrigerator, a heater, etc.

The ventilation device 240 refers to a device that may regulate humidity inside the subway carriage, including a device that directly regulates the humidity (e.g., a humidifier, a dehumidifier, etc.) and a device that indirectly regulates the humidity (e.g., an exhaust fan, etc.). In some embodiments, a plurality of carriages of the subway may exchange gas with an outside environment (e.g., a platform, a subway tunnel, etc.) through the ventilation device 240, and displace the gas in the plurality of carriages by expelling the gas from the carriages and introducing the outside gas into the plurality of carriages, thereby regulating the humidity in the plurality of carriages. In some embodiments, the ventilation device 240 may include an air exchange device such as the exhaust fan. In some embodiments, the ventilation device 240 may also include a device that directly regulates the humidity inside the carriage, such as a humidifier, dehumidifier, etc.

The reference database determination module 250 is configured to construct the reference database. In some embodiments, the reference database may include a plurality of reference temperature data and a plurality of reference humidity data, and the reference refrigeration power corresponding to the plurality of reference temperature data and the reference ventilation corresponding to the plurality of reference humidity data. In some embodiments, the management platform 130 may also construct a temperature vector and a humidity vector based on the temperature data and the humidity data, and, determine an initial refrigeration power corresponding to the temperature vector and an initial ventilation corresponding to the humidity vector by performing a vector matching through the reference database based on the temperature vector and the humidity vector. Detailed descriptions regarding the reference database, the reference temperature data, the reference humidity data, the reference refrigeration power, the reference ventilation, the temperature vector, the humidity vector, the initial refrigeration power, and the initial ventilation, may be found in FIG. 4 and its related descriptions.

The second determination module 260 may predict temperature change data and humidity change data of the plurality of carriages through a prediction model based on the initial refrigeration power and the initial ventilation.

The third determination module 270 may determine control instruction based on the temperature change data and the humidity change data. The control instruction includes determining the refrigeration power adjustment values and the ventilation adjustment values. In some embodiments, the management platform 130 may further be configured to construct a temperature change vector and a humidity change based on the temperature change data and the humidity change data through the third determination module 270, and determine the refrigeration power adjustment values corresponding to the temperature change vector and the ventilation adjustment values corresponding to the humidity change vector by performing the vector matching through the reference database based on the temperature change vector and the humidity change vector through the third determination module 270.

The image monitoring device 280 may collect the pedestrian flow data inside and outside the carriage of the subway. The management platform 130 may be further configured to obtain the pedestrian flow data through the image monitoring device 280, and, determine the refrigeration power adjustment values and the ventilation adjustment values of the plurality of carriages based on the pedestrian flow data through the third determination module 270 and generate the control instruction. Detailed descriptions regarding the pedestrian flow data may be found in FIG. 5 and its related descriptions.

FIG. 3 is a flowchart illustrating an exemplary method for regulating air conditioning temperature of a subway in a smart city according to some embodiments of the present disclosure. The operation of a process 300 described below is illustrative. In some embodiments, one or more additional operations not described and/or one or more operations not discussed may be used to complete the process 300. In addition, a sequence of operations of process 300 illustrated in FIG. 3 and described below are not intended to be limited. As shown in FIG. 3, the process 300 includes the following steps.

Step 310, obtaining temperature data and humidity data inside and outside a carriage of the plurality of carriages of the subway based on the at least one collecting device.

In some embodiments, the plurality of carriages of the subway may refer to all of the carriages of the subway. In some embodiments, the plurality of carriages of the subway may also refer to a portion of the carriages of the subway, which may not include, for example, a driving cab or a control room of the subway, etc.

In some embodiments, the temperature data may refer to an ambient temperature during a current time period (i.e., a continuous period of time up to a current time point). For example, the temperature data in the carriage may refer to ambient temperature data of the current carriage for one hour up to the current time point, etc.

In some embodiments, the humidity data may refer to ambient humidity during the current time period (i.e., a continuous period of time up to the current time point). For example, the humidity data outside the carriage (i.e., the platform) may refer to the ambient humidity data of the platform for three hours up to the current time point, etc.

In some embodiments, the temperature data and the humidity data may also refer to the ambient temperature or ambient humidity at the current moment.

In some embodiments, the collecting device 210 may be configured to collect the temperature data and the humidity data inside and outside of the plurality of carriages of the subway. In some embodiments, the count of the collecting device 210 is at least one. In some embodiments, the collecting device 210 may include, but is not limited to, an instrument that may collect the ambient temperature, such as an infrared temperature sensor, a gas temperature sensor, or a radiation temperature sensor, and may further include an instrument that may collect the ambient humidity such as a hair hygrometer, a dry and wet bulb hygrometer, a dew point hygrometer, a coulomb hygrometer, etc. In some embodiments, the collecting device 210 may include a temperature and humidity meter.

In some embodiments, the at least one collecting device 210 may include at least one first collecting device 211 and at least one second collecting device 212. The count of first collecting device 211 may be the same as or different from the count of second collecting device 212, and a structure or principle of the first collecting device 211 may be the same as or different from a structure or principle of the second collecting device 212.

The first collecting device 211 may be configured to collect the temperature data and the humidity data inside the carriage of the subway. In some embodiments, at least one first collecting device 211 is installed at a first preset position in the carriage and a distance between two adjacent first collecting devices 211 satisfies the first preset condition.

In some embodiments, the at least one first collecting device 211 may be set in the each carriage of the subway to collect the temperature data and the humidity data of the each carriage of the subway. In some embodiments, the first preset position may be a preset installation position of the first collecting device 211. The first preset position may be a position in the carriage where the temperature and the humidity are prone to change, for example, the first preset position may include a position close to an upper side door of the carriage, a position close to and away from a vent, a position above a seat, etc.

In some embodiments, the first preset position may be fixed or may be variable according to an actual situation. In some embodiments, the count of first preset positions may be the same as or different from the count of first collecting devices 211.

In some embodiments, the distance between two adjacent first collecting devices 211 satisfies the first preset condition to improve the accuracy of the data (e.g., temperature data, humidity data, etc.) of the first collecting devices 211. In some embodiments, the distance between two adjacent first collecting devices 211 may refer to the distance between two adjacent first collecting devices 211 in a same carriage, or may also refer to the distance between two adjacent first collecting devices 211 in different carriages.

The too small distance between two adjacent first collecting devices 211 may cause the areas where the data is collected to be close, which not only wastes resources and causes a poor utilization of the first collecting device 211, but also affects the accuracy of the final data because the collected data is similar and does not fully reflect an overall situation in the carriage. The too large distance between two adjacent first collecting devices 211 may cause data of partial areas between the two first collection devices 211 to be not collected, some data may not be representative, thereby affecting the accuracy of the final data. Therefore, a first preset condition may be a preset range, such as within a preset distance range. Exemplarily, the first preset condition may be XXXm-XXXm, i.e., a distance between two adjacent first collecting devices 211 is within a range of XXXm-XXXm.

The second collecting device 212 may be configured to collect the temperature data and the humidity data outside the carriage of the subway. In some embodiments, the second collecting device 212 may be configured to collect the temperature data and the humidity data inside the platform of the subway.

In some embodiments, the at least one second collecting device 212 is installed at a second preset position within the platform, and the distance between two adjacent second collecting devices 212 satisfies the second preset condition. In some embodiments, the at least one second collecting device 212 may be set in the each platform of the subway to collect the temperature data and the humidity data of the each platform of the subway.

In some embodiments, the second preset position may be a position in the platform, where the temperature and the humidity data are representative, for example, a portion close to the top of the side where the subway stops, a stairway entrance, an elevator entrance, etc. The second preset position may be preset or may be temporarily determined. In some embodiments, the second preset position may be fixed or variable. In some embodiments, the count of second preset positions may be the same as or different from the count of second collecting devices 212.

In some embodiments, the distance between two adjacent second collecting devices 212 satisfies a second preset condition to enhance the accuracy of the data (e.g., the temperature data, the humidity data, etc.) of the second collecting device 212. In some embodiments, the distance between two adjacent second collecting devices 212 refers to the distance between the two adjacent second collecting devices 212 in a same platform. The too small distance between two adjacent second collecting devices 212 may cause distortion of the collected data and have an impact on the accuracy of final collected data. Therefore, the second preset condition may be a preset range, such as not less than a preset distance threshold. Exemplarily, the second preset condition may be not less than XXXm, i.e., the distance between the two adjacent second collecting devices 212 is not less than XXXm.

Step 320, determining the refrigeration power adjustment values and the ventilation adjustment values of the plurality of carriages based on the temperature data and the humidity data and generating the control instruction and the control instruction is used to control the temperature regulating device and the ventilation device. More descriptions regarding the temperature regulating device and the ventilation device may be found in FIG. 2 and its descriptions.

In some embodiments, the refrigeration power refers to an operating power of the temperature regulating device 230. The refrigeration power may also be referred to as a heating power when the temperature regulating device 230 is in a heating mode.

In some embodiments, the refrigeration power adjustment values may refer to variation value between a target refrigeration power and a current refrigeration power of the temperature regulation device 230. For example, the refrigeration power adjustment values may be an increase of 0.2 kW, a decrease of 0.5 kW, etc. In some embodiments, the target refrigeration power is the operating power of the temperature regulating device 230 to adjust the temperature in the carriage to a preset temperature. The current refrigeration power is the operating power of the temperature regulation device 230 at the current time point.

In some embodiments, the ventilation refers to a total amount of air replaced with an outside environment per unit of time in the carriage of the subway, i.e., the operating power of the ventilation device 240. In some embodiments, when the ventilation device 240 also includes the humidifier, the dehumidifier, and other devices that regulate the humidity directly. The ventilation may also refer to an operating power of the ventilation device 240 to humidify or dehumidify.

The ventilation adjustment values may refer to the variation values between the target ventilation of the ventilation device 240 and the current ventilation of the ventilation device 240. For example, the ventilation adjustment values may be an increase of 15 m³/h, a decrease of 10 m³/h, etc. In some embodiments, the target ventilation is the operating power of the ventilation device 240 to adjust the humidity in the carriage to a preset humidity. The current ventilation is the operating power of the ventilation device 240 at the current time point.

In some embodiments, the control instruction is an instruction to control an adjustment of the refrigeration power of the air conditioner of the subway and/or the ventilation of the ventilation device. In some embodiments, the control instruction may include the refrigeration power adjustment values and the ventilation adjustment values. For example, the control instruction may be increasing the refrigeration power of the air conditioner of the subway by 0.5 kW and increasing the ventilation of the ventilation device by 10 m³/h, etc. The management platform 130 may control the temperature adjustment device 230 and the ventilation device 240 according to the control instruction, change the operating power of the temperature adjustment device 230 and the ventilation device 240 according to the corresponding refrigeration power adjustment values and the corresponding ventilation adjustment values respectively, and adjust the current operating power to the target operating power, thereby regulating the temperature and the humidity in the carriage.

In some embodiments, the determining refrigeration power adjustment values and ventilation adjustment values of the plurality of carriages based on the temperature data and the humidity data and generating a control instruction may include: constructing the temperature vector and the humidity vector based on the temperature data and the humidity data, and determining an initial refrigeration power corresponding to the temperature vector and an initial ventilation corresponding to the humidity vector by performing the vector matching through the reference database based on the temperature vector and the humidity vector. Detailed descriptions may be found in FIG. 4 and the process 400. After determining the initial refrigeration power and the initial ventilation, the refrigeration power adjustment value, the ventilation adjustment values, and the control instruction may be determined based on the initial refrigeration power and the initial ventilation. Detailed descriptions may be found in FIG. 5 and the process 500.

It should be noted that the above description of the process 300 is merely provided for the purposes of illustration, and is not intended to limit the scope of the present disclosure. For those skilled in the art, various amendments and variations may be made to the process 300 under the teachings of the present disclosure. However, these amendments and variations remain within the scope of the present disclosure.

In some embodiments of the present disclosure, the temperature data and the humidity data inside and outside the carriage may be collected through the at least one collecting device 210, the refrigeration power adjustment values and the ventilation adjustment values may be determined based on the temperature data and the humidity data through the management platform 130, and the control instruction may be generated, so that the temperature control device 230 and ventilation device 240 may timely and accurately regulate the ambient temperature and the ambient humidity inside the carriage, so as to improve comfort of the people inside the carriage.

FIG. 4 is an exemplary flowchart of determining initial refrigeration power and initial ventilation according to some embodiments of the present disclosure. As shown in FIG. 4, a process 400 includes the following steps:

Step 410, constructing the temperature vector and the humidity vector based on the temperature data and the humidity data.

In some embodiments, the management platform 130 may construct a corresponding temperature vector based on the temperature data inside and outside the carriage of the subway and construct a corresponding humidity vector based on the humidity data. Feature information of the temperature/humidity vector may include collection position information, collection time point, a magnitude of the temperature/humidity, etc. The collection position data refers to the information on the collection position of the temperature/humidity data, such as the first preset position or the second preset position, inside the carriage or the platform, etc. The collection time point refers to a specific moment of collecting the temperature/humidity data, such as 12:35 p.m., etc.

The temperature vector is a vector constructed based on the temperature data of the carriage. There may be various ways to construct the temperature vector based on the temperature data. For example, a feature vector p is constructed based on a temperature feature (x, y, z) of the corresponding temperature data. The temperature feature (x, y, z) may indicate the position data of the corresponding temperature as x, the time point as y, and the temperature as z. The humidity vector is also a vector constructed based on the humidity data of the carriage, and a constructing way of the humidity vector may refer to the constructing way of the temperature vector.

Step 420, determining the initial refrigeration power corresponding to the temperature vector and an initial ventilation corresponding to the humidity vector by performing the vector matching through the reference database based on the temperature vector and the humidity vector.

In some embodiments, the management platform 130 may initially determine the refrigeration power corresponding to the temperature data (i.e., an initial refrigeration power) through the reference database based on the temperature vector and the humidity vector, and determine the ventilation corresponding to the humidity data (i.e., initial ventilation) through the reference database based on the temperature vector and the humidity vector. In some embodiments, after determining the initial refrigeration power and the initial ventilation, the management platform 130 may determine the refrigeration power adjustment values, the ventilation adjustment values, and the control instruction based on the initial refrigeration power and the initial ventilation, so that the temperature adjustment device 230 and the ventilation device 240 may regulate the temperature and the humidity in the carriage accurately. Detailed descriptions may be found in FIG. 5 and the process 500.

In some embodiments, the reference database may be constructed by the management platform 130 through a reference database determination module 260. The reference database may include reference data. The reference data may include manual input data and historical record data. In particular, the historical record data is data recorded prior to the current time period, and the historical record data may be obtained from other relevant components. For example, when the reference data includes the temperature data, the history record temperature data may be obtained from the collecting device 210, or from a storage or processor that stores the relevant data. The manual input data may refer to the data that is actively input by the user. The reference database may record, save, or analyze the historical data for subsequent use.

In some embodiments, the reference database may include the plurality of reference temperature data and the plurality of reference humidity data. The reference temperature data and the reference humidity data may be the corresponding temperature data and the corresponding humidity data inside and outside the carriage prior to the current time period. The reference temperature data and the reference humidity data may be collected by the first collecting device 211 and/or the second collecting device 212 or may be manually input by the user.

In some embodiments, the reference database may include the reference refrigeration power and the reference ventilation. The reference refrigeration power refers to the refrigeration power of the temperature regulation device 230 under the corresponding reference temperature data. The reference ventilation is the ventilation of the ventilation device 240 under the corresponding reference humidity data.

In some embodiments, the reference database may also include a reference temperature vector and a reference humidity vector. The constructing way of the reference temperature vector and the reference humidity vector may refer to that of the temperature vector.

The management platform 130 may calculate the distance between the temperature vector and the reference temperature vector and the distance between the humidity vector and the reference humidity vector, respectively, thereby determining the initial refrigeration power and the initial ventilation. For example, the reference temperature vector whose distance from the temperature vector satisfies the third preset condition is determined as a target temperature vector, the reference humidity vector whose distance from the humidity vector satisfies a fourth preset condition is determined as a target humidity vector, and the reference refrigeration power corresponding to the target temperature vector and the reference ventilation corresponding to the target humidity vector are determined as the initial refrigeration power corresponding to the temperature vector and the initial ventilation corresponding to the humidity vector. The third preset condition and the fourth preset condition may be set according to the situation. For example, the third preset condition and/or the fourth preset condition may be that a vector distance is minimum or that the vector distance is less than a distance threshold, etc.

Since in different seasons and different weather conditions, for the same temperature data, the temperature regulating device 230 has different difficulty in adjusting the temperature, and therefore the refrigeration power of the temperature regulating device 230 may be different. For the same humidity data, the ventilation device 240 has different difficulty in adjusting the humidity, and therefore the ventilation of the ventilation device 240 may be different. Therefore, in some embodiments, the seasonal data and weather data also need to be considered when determining the initial refrigeration power and the initial ventilation.

In some embodiments, the feature information of the temperature/humidity vector may also include the seasonal data and the weather data, and the seasonal data and the weather data refer to season and weather conditions of the external environment when collecting the temperature/humidity data, for example, the season of the external environment when collecting the data is summer, the weather is heavy rain, etc. At this time, the feature vector p is constructed based on the temperature feature (x, y, z, m, n) of the corresponding temperature data, the temperature feature (x, y, z, m, n) may indicate the position data of the corresponding temperature as x, the time point as y, the temperature as z, the season as m, and the weather as n. Correspondingly, the reference database may also include the reference seasonal data and the reference weather data. The reference seasonal data and the reference weather data may refer to the seasonal data and weather data of the external environment before the current time period. The constructing way of the reference temperature vector, the humidity vector, and the reference humidity vector may refer to the constructing way of the temperature vector.

In some embodiments of the present disclosure, the initial refrigeration power and the initial ventilation may be determined based on temperature data and humidity data through the reference database, the initial refrigeration power corresponding to the temperature data and the initial ventilation corresponding to the humidity data may be easily and quickly determined by performing the vector matching, and abundant data accumulation enhances the accuracy of determined initial refrigeration power and initial ventilation.

FIG. 5 is an exemplary flowchart of determining refrigeration power adjustment values and ventilation adjustment values according to some embodiments of the present disclosure. In some embodiments, the process 500 may be performed by the management platform 130 of the Internet of Things system 100 for regulating air conditioning temperature of the subway in the smart city. As shown in FIG. 5, the process 500 includes the following steps.

Step 510, predicting the temperature change data and the humidity change data of the plurality of carriages through a prediction model based on the initial refrigeration power and the initial ventilation, and the prediction model being a machine learning model.

The temperature change data is a temperature change of a particular carriage of the subway at a plurality of time points after the collection time point. The temperature change may be indicated by the temperature data after the collecting time. For example, the temperature change data may be the temperature change data (10° C., 15° C., 18° C., or 17° C.) for a carriage from the collecting time point, the $K_1$ th minute, the $K_2$ th minute, and the $K_3$ th minute, which indicates that the temperature of the carriage increases by 5° C. at the $K_1$ th minute after the collecting time point, increases by 3° C. at the $K_2$ th minute after the $K_1$ th minute, decreases by 1° C. at the $K_3$ th minute after the $K_2$ th minute, etc.

The humidity change data refers to the humidity change of a particular carriage of the subway at the plurality of time points after the collection time point. For example, the humidity change data may be the temperature change data (45%, 55%, 59%, 54%) of a carriage of the subway from the collection time point, the $K_1$ th minute, the $K_2$ th minute, and the $K_3$ th minute, which indicates that the humidity of that carriage increases by 10% at the $K_1$ th minute after the collection time point, increases by 4% at the $K_2$ th minute after the $K_1$ th minute, decreases by 5% at the $K_3$ th minute after the $K_1$ th minute, etc.

In some embodiments, the temperature change data and the humidity change data may be determined by subway managers based on data such as the weather (e.g., temperature, air humidity, etc.), the pedestrian data flow, etc. For example, the temperature data of the subway may be larger as the temperature rises and the pedestrian data flow increases. As another example, as air humidity increases, the humidity data of the carriage of the subway may increase, etc.

In some embodiments, the temperature change data and the humidity change data of the carriage of the subway may also be determined based on the prediction model. The prediction model is a machine learning model. Detailed descriptions regarding the prediction model may be found in FIG. 6 and its related descriptions.

Step 520, determining the control instruction based on the temperature change data and the humidity change data, and the control instruction including determining the refrigeration power adjustment values and the ventilation adjustment values.

In some embodiments, the refrigeration power adjustment values and the ventilation adjustment values may be determined based on the following sub-steps.

Step 521, constructing a temperature vector and a humidity vector based on the temperature data and the humidity data.

The temperature change vector refers to the vector corresponding to the temperature change data of a certain subway operation line at the plurality of time points after the collection time point. For example, the temperature change vector may be indicated as $(T_1, T_2, T_3, \ldots, T_n)$. Each element of the vector indicates the temperature change vector corresponding to the temperature change data of the carriage of the subway at different time points. For example, $T_1$ indicates the vector of the temperature change data of the plurality of carriages of the subway at the $K_1$ th minute after the collecting time point, $T_n$ indicates the vector of temperature change data of the plurality of carriages of the subway at the $K_n$ minute after the collecting time point, etc.

In some embodiments, at least one of the temperature change vectors of the plurality of time points may include the temperature change data of the plurality of carriages of the subway at the time point. For example, $T_1$ may be indicated as $(t_{11}, t_{12}, t_{13}, \ldots, t_{1m})$, and $T_n$ may be indicated as $(t_{n1}, t_{n2}, t_{n3}, \ldots, t_{nm})$. $t_{11}, t_{12}, t_{13}, \ldots, t_{1m}$ denote the temperature change data corresponding to the $1^{st}$, $2^{nd}$, $3^{rd}, \ldots, m^{th}$ carriage at the $K_1$ th minute after the collecting time point, respectively. $t_{n1}, t_{n2}, t_{n3}, \ldots, t_{nm}$, denote the temperature change data corresponding to the $1^{st}$, $2^{nd}$, $3^{rd}, \ldots, m^{th}$ carriage at the $K_n$ th minute after the collecting time point, respectively.

The humidity change vector refers to the vector corresponding to the humidity change data of a certain subway operation line at the plurality of time points after the collection time point. For example, the humidity change vector may be indicated as $(W_1, W_2, W_3, \ldots, W_n)$. The each element of the vector indicates the humidity change vector corresponding to the humidity change data of the carriage of the subway at different time points. For example, $W_1$ indicates the vector corresponding to the humidity change data of the plurality of carriages of the subway at the $K_1$ th minute after the collecting time point, and $W_n$ indicates the vector corresponding to the humidity change data of the plurality of carriages of the subway at the $K_n$ th minute after the collecting time point, etc.

In some embodiments, at least one of the humidity change vectors of the plurality of time points may include the humidity change data of the plurality of carriages of the subway at the time point. For example, $W_1$ may be indicated as $(w_{11}, w_{12}, w_{13}, \ldots, w_{1m})$, and $W_n$ may be indicated as $(w_{n1}, w_{n2}, w_{n3}, \ldots, w_{nm})$. $w_{11}, w_{12}, w_{13}, \ldots, w_{1m}$ denote the humidity change data corresponding to the $1^{st}$, $2^{nd}$, $3^{rd}, \ldots, m^{th}$ carriage at the $K_1$ th minute after the collecting time point, respectively; $w_{n1}, w_{n2}, w_{n3}, \ldots, w_{nm}$ denote the humidity change data corresponding to the $1^{st}$, $2^{nd}$, $3^{rd}, \ldots, m^{th}$ carriage at the $K_n$ th minute after the collecting time point, respectively.

Step 522, determining the refrigeration power adjustment values corresponding to the temperature change vector and the ventilation adjustment values corresponding to the humidity change vector by performing the vector matching through the reference database based on the temperature change vector and the humidity change vector.

In some embodiments, the performing the vector matching through the reference database based on the temperature change vector and the humidity change vector includes: determining the prediction data based on the temperature change vector and the humidity change vector, and determining a target vector (including the target temperature vector and the target humidity vector, detailed descriptions may be found in FIG. 4 and its descriptions) based on the prediction data.

The prediction data refers to the data predicted by the prediction model after the temperature, the humidity, the weather, and other data at the plurality of time points change after the collection time point. In some embodiments, the prediction data may include predicted temperature data, predicted humidity data, etc.

The predicted temperature data refers to the temperature data predicted by the prediction model when the weather, pedestrian flow data, etc. change. In some embodiments, the predicted temperature data may be determined based on current temperature data collected by the collecting device and the temperature change vector. For example, the current temperature data corresponding to the plurality of carriages of the subway collected by subway line 1 may be indicated by the vector $T_A$ as $(T_1, T_2, T_3, \ldots, T_n)$, then the predicted temperature data corresponding to the plurality of carriages of the subway of subway line 1 at the plurality of time points $K_1, K_2, \ldots, K_n$ after the collection time point may be indicated by the vector as $(T_A+T_1, T_A+T_2, T_A+T_3, \ldots, T_A+T_n)$.

The predicted humidity data is the humidity data predicted by the prediction model when the weather, foot traffic, etc. changes. In some embodiments, the predicted humidity data may be determined based on the current humidity data collected by the collecting device and the humidity change vector. For example, the current humidity data corresponding to the plurality of carriages of the subway collected by subway line 1 may be represented by the vector $W_A$ as $(W_1, W_2, W_3, \ldots, W_n)$, then the predicted humidity data corresponding to the plurality of carriages of the subway of subway line 1 at the plurality of time points $K_1, K_2, \ldots, K_n$ after the collection time point may be represented by the vector as $(W_A+W_1, W_A+W_2, W_A+W_3, \ldots, W_A+W_n)$.

The target vector is the vector corresponding to the reference data whose vector distance from the predicted data satisfies conditions such as a minimum vector distance or the vector distance less than a preset distance threshold. More descriptions regarding the related descriptions of the reference data and the reference database may be found in FIG. 4 and its related descriptions.

In some embodiments, the management platform may determine the reference refrigeration power and the reference ventilation corresponding to the target vector as the predicted refrigeration power and the predicted ventilation. The predicted refrigeration power and the predicted ventilation are the refrigeration power of air conditioner of the subway corresponding to the predicted temperature data and the ventilation of the ventilation device corresponding to the predicted humidity data.

In some embodiments, the refrigeration power adjustment values and the ventilation adjustment values may be determined based on the initial refrigeration power, the initial ventilation, the predicted refrigeration power, and the predicted ventilation. For example, the refrigeration power adjustment values may be a difference between the predicted refrigeration power and the initial refrigeration power, and the ventilation adjustment values may be the difference between the predicted ventilation and the initial ventilation, etc.

In some embodiments, the refrigeration power adjustment values and the ventilation adjustment values may also be related to the pedestrian flow data. In some embodiments, the management platform 130 may obtain the pedestrian flow data based on an image monitoring device 280.

The pedestrian flow data is the related data of the pedestrian flow data in the subway carriage and/or on the platform of the subway station. In some embodiments, the pedestrian flow data may include a count of people in the carriages of the subway, a count of people waiting in front of platforms at the station of the subway, etc.

In some embodiments, the pedestrian flow data may also be gender and age data of the people in the carriages of the subway or waiting in front of platforms at station of the subway.

In some embodiments, the pedestrian flow data may be determined based on the information such as pictures, videos, etc., obtained by the image monitoring device 280 through the machine learning model, (e.g., a convolutional neural network model, etc.) or a plurality of algorithms such as person detection, image recognition, etc. For example, the count of people in the carriage and the count of people waiting in front of the platforms at the station of the subway may be determined based on a person detection algorithm. For example, the gender and age data of the people in the carriage and the people waiting in front of the platforms at the station of the subway may be determined based on image recognition technology.

In some embodiments, the pedestrian flow data may be used to determine the refrigeration power adjustment values and the ventilation adjustment values of the plurality of carriages and generate the control instruction. For example, different pedestrian flow data may correspond to different predicted temperature change data and different predicted humidity change data, and the corresponding refrigeration power and ventilation of carriages of the subway may be different, etc. As another example, people of different ages and genders may have different perceptions of temperature and humidity (e.g., men may prefer lower temperatures than women, young people may prefer lower temperatures than older people, etc.). The management platform 130 may select a control instruction that are most suitable for the current pedestrian flow data based on statistical data, etc.

In some embodiments of the present disclosure, the refrigeration power adjustment values of the carriages of the subway and the ventilation adjustment values of the carriages of the subway are determined through the reference vector and the reference database based on the predicted temperature change data and the predicted humidity change data, which may increase the efficiency of data processing to some extent.

It should be noted that the above description of process 500 is merely provided for the purposes of illustration, and not intended to limit the scope of the present disclosure. For those skilled in the art, various amendments and variations may be made to the process 500 under the teachings of the present disclosure. However, these amendments and variations remain within the scope of the present disclosure.

Figure 6:
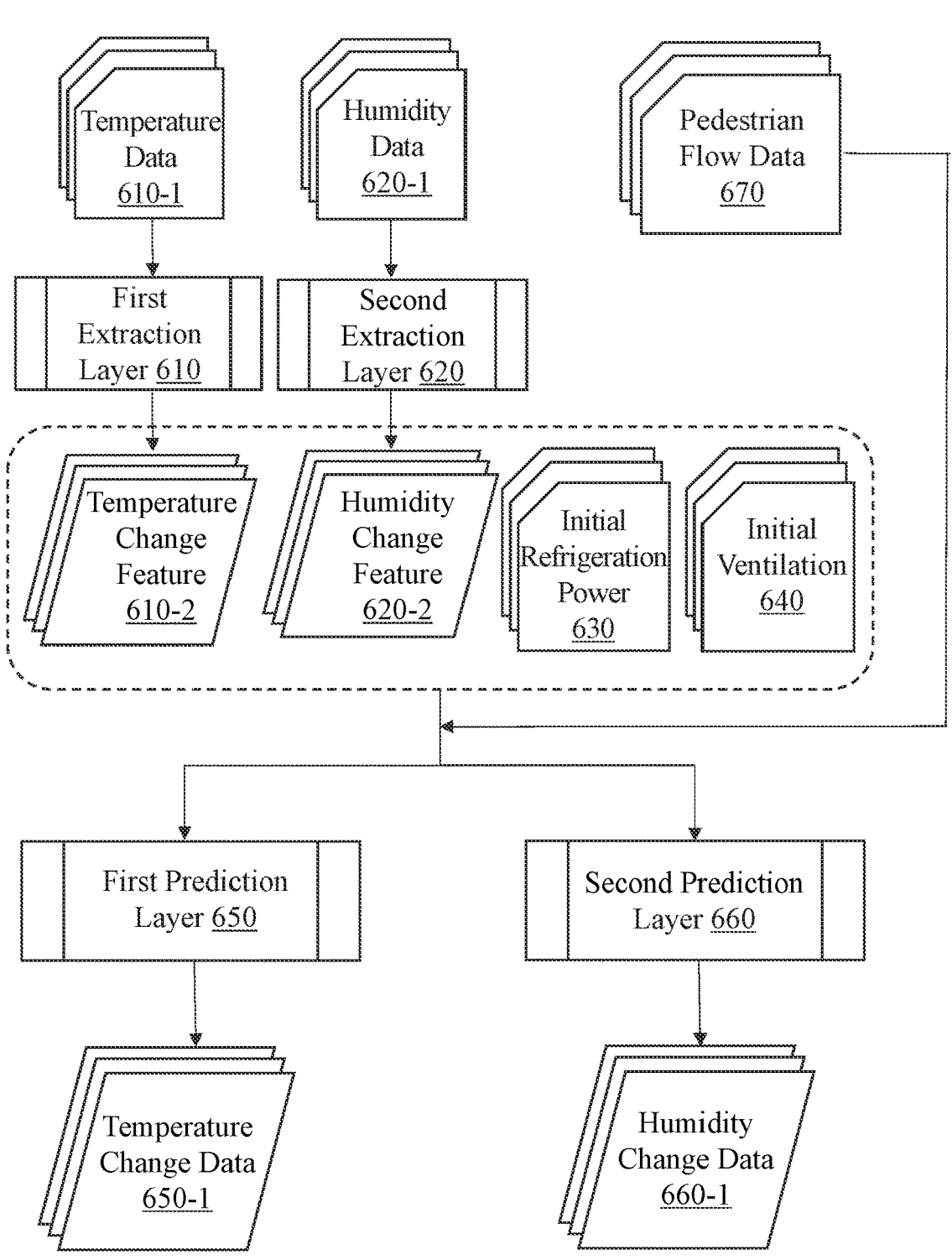
FIG. 6 is a schematic diagram illustrating a prediction model according to some embodiments of the present disclosure.

FIG. 6 is a schematic diagram illustrating a prediction model according to some embodiments of the present disclosure. As shown in FIG. 6, a prediction model 600 may include a first extraction layer 610, a second extraction layer 620, a first prediction layer 650, a second prediction layer 660, or the like.

The prediction model 600 is a model for predicting the temperature change data and the humidity change data in the carriages of the subway. In some embodiments, the prediction model may be the machine learning model. For example, the prediction model may include a Recurrent Neural Network model (RNN), a Neural Networks model (NN), a Deep Neural Networks model (DNN), etc., or any combination thereof.

A first extraction layer 610 may be configured to obtain a temperature change feature based on the temperature data. In some embodiments, an input of the first extraction layer 610 may include temperature data 610-1 and an output of the first extraction layer 610 may include a temperature change feature 610-2.

The temperature data 610-1 may include temperature data collected by a plurality of collecting devices at different positions in the carriages of the subway. More descriptions regarding the temperature data may be found in FIG. 3 and the related descriptions.

The temperature change feature 610-2 is a feature of temperature data changing at a plurality of different time points up to the collecting time point. For example, the different elements in the temperature change feature (a, b, c, . . . ) indicate a temperature data at the plurality of different time points such as $Q_1, Q_2, Q_3$, etc., prior to the collecting time point (e.g., prior to the collecting time point, the temperature at the $Q_1$ time point is a ° C., the temperature at the $Q_2$ time point is b ° C., etc.). In some embodiments, the temperature change feature may reflect the change trend (e.g., falling, rising, etc.) of temperature data of the carriage of the subway and a rate of change (e.g., falling 3° C. per hour, rising 1° C. per hour), etc.

A second extraction layer 620 may be configured to obtain the humidity change feature based on the humidity data. In some embodiments, the input of the second extraction layer 620 may include humidity data 620-1 and the output of the second extraction layer 620 may include a humidity change feature 620-2.

The humidity data 620-1 may include humidity data collected by the plurality of collecting devices at different positions in the carriages of the subway. More descriptions regarding the humidity data may be found in FIG. 3 and the related descriptions.

The humidity change feature 620-2 refers the feature of humidity data changing at a plurality of different time points up to the collecting time point. For example, the different elements in the humidity change feature (x, y, z, . . . ) indicate humidity data at the plurality of different time points such as $Q_1$, $Q_2$, $Q_3$, etc., prior to the collecting time point (e.g., prior to the collecting time point, the humidity at the $Q_1$ time point is x %, the humidity at the $Q_2$ time point is y %, etc.). In some embodiments, the humidity change feature may reflect the change trend (e.g., falling, rising, etc.) of humidity data of the carriage of the subway and a rate of change (e.g., falling 5% per hour, rising 3% per hour), etc.

A first prediction layer 650 may be configured to predict the temperature change data of the carriage of the subway (i.e., the temperature data at a plurality of subsequent time points). In some embodiments, the input of the first prediction layer 650 includes a temperature change feature 610-2, a humidity change feature 620-2, an initial refrigeration power 630, an initial ventilation 640, etc., and the output of the first prediction layer 650 may include temperature change data 650-1.

A second prediction layer 660 may be configured to predict the humidity change data of the carriage of the subway (i.e., the humidity data at a plurality of subsequent time points). In some embodiments, the input of the second prediction layer 660 includes temperature change feature 610-2, the humidity change feature 620-2, the initial refrigeration power 630, the initial ventilation 640, etc., and the output of the second prediction layer 660 may include humidity change data 660-1.

Descriptions regarding the temperature change feature, the humidity change feature, the initial refrigeration power, the initial ventilation, the temperature change data, etc. may be found in the related previous descriptions.

In some embodiments, the input of the first prediction layer 650 and the second prediction layer 660 of the prediction model 600 may also include pedestrian flow data 670.

In some embodiments, the input of the prediction model 600 including the pedestrian flow data 670 may improve the accuracy of the model's output, and simultaneously cause a control instruction determined based on the model's output to be better adapted to more passengers, so as to obtain better effect.

In some embodiments, the prediction model 600 may be determined based on a large amount of historical data through joint training of the first extraction layer 610, the second extraction layer 620, the first prediction layer 650, and the second prediction layer 660.

The historical data may include training samples and training labels. The training samples include a plurality of sets of temperature data and humidity data prior to the historical moments, historical refrigeration powers, and historical ventilation. In some embodiments, the training samples may also include the pedestrian flow data. The training labels may include a first training label and a second training label.

The first training label refers to the training label corresponding to the first prediction layer 650. In some embodiments, the first training label may include actual temperature change data after a historical moment (i.e., actual temperature data at the plurality of time points after the historical moment). In some embodiments, the first training label may include a plurality of sets of first training labels, and at least one of a plurality of sets of the training samples may have a correspondence with the plurality of sets of the first training labels. For example, the first training labels corresponding to a set of training samples including temperature data and the humidity data prior to historical moment, the historical refrigeration power, and the historical ventilation may be the temperature data after running the air conditioner and ventilation device of the subway with the historical refrigeration power, historical ventilation, etc.

The second training label is the training label corresponding to the second prediction layer 660. In some embodiments, the second training label may include actual humidity change data after the historical moment (i.e., the actual humidity data at a plurality of time points after the historical moment). In some embodiments, the second training label may include a plurality of sets of the second training labels, and at least one set of the plurality of sets of the training samples may have a similar correspondence with the plurality of second training labels as the correspondence between the first training labels and the training samples. Detailed descriptions may be found in the related portions of the above descriptions.

In some embodiments, the training samples and the training labels may be obtained through manual collecting the historical subway operation data.

In some embodiments, the temperature change feature and the humidity change feature output by the first extraction layer 610 and the second extraction layer 620 may be used as the input of the first prediction layer 650 and the second prediction layer 660. The process of joint training includes: inputting the temperature data 610-1 before the historical moment in the training sample into the first extraction layer 610 to obtain the temperature change feature 610-2, inputting the humidity data 620-1 before the historical moment in the training sample into the second extraction layer 620 to obtain the humidity change feature 620-2, inputting the temperature change feature 610-2 and the humidity change feature 620-2, the historical refrigeration power, the historical ventilation, and the historical pedestrian flow data output by the first extraction layer 610 and the second extraction layer 620 in to the first prediction layer 650 to obtain the output of the first prediction layer 650, inputting the temperature change feature 610-2 and humidity change feature 620-2, the historical refrigeration power, the historical ventilation, and historical pedestrian flow data into the second prediction layer 660 to obtain the output of the second prediction layer 660, inputting the temperature change data 650-1 outputted by the first prediction layer 650 and the first training label into a first loss function, inputting the humidity change data 660-1 outputted by the second prediction layer 660 and the second training label into a second loss function, and updating the first prediction layer 650 based on the first loss function and updating the second prediction layer 660 based on the second loss function until the preset condition is satisfied to obtain the trained prediction model 600. The preset condition may include that the loss function is less than a threshold, converges, or a training period reaches the threshold, etc.

In some embodiments of the present disclosure, the prediction model may predict the change of the temperature and the humidity of different carriages more accurately and quickly, thereby enabling advanced management of the air conditioner of the subway and the ventilation device to provide a better riding experience for passengers.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for regulating air conditioning temperature of a subway in a smart city, comprising:

obtaining, based on at least one collecting device, temperature data and humidity data inside and outside a carriage of a plurality of carriages of the subway, the at least one collecting device including at least one of an infrared temperature sensor, a gas temperature sensor, a radiation temperature sensor, a hair hygrometer, a dry and wet bulb hygrometer, a dew point hygrometer, a coulomb hygrometer, and a temperature and humidity meter; wherein the at least one collecting device includes at least two first collecting devices and at least two second collecting devices, the at least two first collecting devices are installed at a first preset position inside the carriage, and a distance between two adjacent first collecting devices satisfies a first preset condition; and the at least two second collecting devices are installed at a second preset position within a platform, and a distance between two adjacent second collecting devices satisfies a second preset condition;

determining, based on the temperature data and the humidity data, refrigeration power adjustment values and ventilation adjustment values of the plurality of carriages;

generating a control instruction for controlling a temperature regulation device and a ventilation device based on the refrigeration power adjustment values and the ventilation adjustment values of the plurality of carriages, the temperature regulating device including an air conditioner, a refrigerator, and a heater, the ventilation device including a device that directly regulates humidity and a device that indirectly regulates the humidity, the device that directly regulates the humidity including a humidifier and a dehumidifier, the device that indirectly regulates the humidity including an exhaust fan, the control instruction referring to an instruction for controlling an adjustment of a refrigeration power of a subway air conditioner and/or a ventilation of the ventilation device, the control instruction including the refrigeration power adjustment values and the ventilation adjustment values;

controlling the temperature regulation device based on the control instruction to regulate temperature of the plurality of carriages, including:

adjusting current operating power of the temperature regulation device to target operating power according to a corresponding refrigeration power adjustment value of the temperature regulation device; and controlling the ventilation device based on the control instruction to regulate humidity of the plurality of carriages, including:

adjusting current operating power of the ventilation device to target operating power of the ventilation device according to a corresponding ventilation adjustment value.

2. The method of claim 1, wherein the determining, based on the temperature data and the humidity data, refrigeration power adjustment values and ventilation adjustment values of the plurality of carriages includes:

constructing, based on the temperature data and the humidity data, a temperature vector and a humidity vector; and determining an initial refrigeration power corresponding to the temperature vector and an initial ventilation corresponding to the humidity vector by performing, based on the temperature vector and the humidity vector, a vector matching through a reference database.

3. The method of claim 2, wherein the reference database includes a plurality of reference temperature data and a plurality of reference humidity data, and a reference refrigeration power corresponding to each of the plurality of reference temperature data and a reference ventilation corresponding to each of the plurality of reference humidity data.

4. The method of claim 3, wherein the reference database further includes reference seasonal data and reference weather data.

5. The method of claim 2, further comprising:

predicting, based on the initial refrigeration power and the initial ventilation, temperature change data and humidity change data of the plurality of carriages through a prediction model, wherein the prediction model is a machine learning model; and determining, based on the temperature change data and the humidity change data, the control instruction, wherein the control instruction includes determining the refrigeration power adjustment values and the ventilation adjustment values.

6. The method of claim 5, wherein:

an input of the prediction model includes the temperature data and the humidity data;

the prediction model includes a first extraction layer, a second extraction layer, a first prediction layer, and a second prediction layer;

an input of the first extraction layer includes the temperature data, and an output of the first extraction layer includes a temperature change feature;

an input of the second extraction layer includes the humidity data, and an output of the second extraction layer includes a humidity change feature;

an input of the first prediction layer includes the temperature change feature, the humidity change feature, the initial refrigeration power, and the initial ventilation, and an output of the first prediction layer includes the temperature change data; and an input of the second prediction layer includes the temperature change feature, the humidity change feature, the initial refrigeration power, and the initial ventilation, and an output of the second prediction layer includes the humidity change data.

7. The method of claim 5, wherein the input of the prediction model further includes pedestrian flow data.

8. The method of claim 7, wherein the prediction model is obtained through a joint training, and the joint training includes:

taking a plurality of sets of temperature data prior to historical moments, a plurality of sets of humidity data prior to historical moments, historical refrigeration powers, a historical ventilation, and historical pedestrian flow data as training samples;

taking actual temperature change data after a historical moment as a first training label, the first training label being a training label corresponding to the first prediction layer;

taking actual humidity change data after the historical moment as the second training label, the second training label being a training label corresponding to the second prediction layer;

inputting the plurality of sets of temperature data prior to historical moments in the training sample into the first extraction layer to obtain the temperature change feature;

inputting the plurality of sets of humidity data prior to historical moments in the training sample into the second extraction layer to obtain the humidity change feature;

inputting the temperature change feature, the humidity change feature, the historical refrigeration power, the historical ventilation, and the historical pedestrian flow data into the first prediction layer to obtain the output of the first prediction layer;

inputting the temperature change feature, the humidity change feature, the historical refrigeration power, the historical ventilation, and the historical pedestrian flow data into the second prediction layer to obtain the output of the second prediction layer;

inputting the temperature change data output by the first prediction layer and the first training label into a first loss function, inputting the humidity change data output by the second prediction layer and the second training label into a second loss function;

obtaining a trained prediction model by updating the first prediction layer based on the first loss function and updating the second prediction layer based on the second loss function until a preset condition is satisfied, wherein the preset condition includes that the loss function being less than a threshold or converging, or a training period reaching a threshold.

9. The method of claim 7, wherein the pedestrian flow data includes a count of people in the plurality of carriages of the subway, a count of people waiting in front of plat-
forms at a station of the subway, gender and age data of the
count of people in the plurality of carriages of the subway or
the count of people waiting in front of platforms at the
station of the subway, and the pedestrian flow data is used
to determine the refrigeration power adjustment values and
the ventilation adjustment values of the plurality of carriages
and generate the control instruction.

10. The method of claim 9, wherein the count of people
in the plurality of carriages of the subway and the count of
people waiting in front of the platforms at the station of the
subway are determined based on a person detection algo-
rithm.

11. The method of claim 5, wherein the determining the
refrigeration power adjustment values and the ventilation
adjustment values includes:

constructing, based on the temperature change data and
    the humidity change data, a temperature change vector
    and a humidity change vector; and determining the refrigeration power adjustment values
    corresponding to the temperature change vector and the
    ventilation adjustment values corresponding to the
    humidity change vector by performing, based on the
    temperature change vector and the humidity change
    vector, the vector matching through the reference data-
    base.

12. The method of claim 11, wherein temperature change
vectors refer to vectors corresponding to the temperature
change data of a certain subway operation line at a plurality
of time points after a collection time point, at least one of the
temperature change vectors of the plurality of time points
includes the temperature change data of the plurality of
carriages of the subway at a corresponding time point;
humidity change vectors refer to vectors corresponding to
the humidity change data of the certain subway operation
line at the plurality of time points after the collection time
point, at least one of the humidity change vectors of the
plurality of time points includes the humidity change data of
the plurality of carriages of the subway at a corresponding
time point.

13. The method of claim 11, wherein the determining the
refrigeration power adjustment values corresponding to the
temperature change vector and the ventilation adjustment
values corresponding to the humidity change vector by
performing, based on the temperature change vector and the
humidity change vector, the vector matching through the
reference database includes:

determining prediction data based on the temperature
    change vector and the humidity change vector through
    the prediction model, wherein the prediction data
    includes predicted temperature data and predicted
    humidity data;

determining a target vector based on the prediction data,
    wherein the target vector refers to a vector correspond-
    ing to reference data whose vector distance from the
    predicted data satisfies vector conditions, the vector
    conditions include the vector distance from the pre-
    dicted data is a minimum vector distance or vector
    distance from the predicted data less than a preset
    distance threshold, and the reference data is obtained
    from the reference database;

determining a reference refrigeration power and a refer-
    ence ventilation corresponding to the target vector as a
    predicted refrigeration power and a predicted ventila-
    tion, wherein the predicted refrigeration power and the
    predicted ventilation are a refrigeration power of a
    subway air conditioner corresponding to the predicted
    temperature data and a ventilation of a ventilation
    device corresponding to the predicted humidity data;

determining the refrigeration power adjustment values
    based on a difference between the predicted refrigera-
    tion power and the initial refrigeration power; and determining the ventilation adjustment values based on a
    difference between the predicted ventilation and the
    initial ventilation.

14. The method of claim 2, wherein the determining the
initial refrigeration power corresponding to the temperature
vector and the initial ventilation corresponding to the humid-
ity vector by performing, based on the temperature vector
and the humidity vector, the vector matching through the
reference database includes:

calculating a distance between the temperature vector and
    a plurality of reference temperature vectors in the
    reference database, and determining a reference refrig-
    eration power corresponding to a reference temperature
    vector satisfies a third preset condition as the initial
    refrigeration power; and calculating a distance between the humidity vector and a
    plurality of reference humidity vectors in the reference
    database, and determining a reference ventilation cor-
    responding to a reference humidity vector satisfies a
    fourth preset condition as the initial refrigeration
    power.

15. The method of claim 1, wherein
the first preset position includes a position close to an
    upper side door of the carriage, a position close to a
    vent, a position away from the vent, and a position
    above a seat; and
the second preset position includes a position close to a
    top of a side where the subway stops, a stairway
    entrance, and an elevator entrance.

* * * * *